US012532895B2

(12) United States Patent
Ur Rehman et al.

(10) Patent No.: US 12,532,895 B2
(45) Date of Patent: Jan. 27, 2026

(54) PRODUCTION AND SEPARATION OF MILK FRACTIONS WITH ELECTRODIALYSIS

(71) Applicant: Fairlife, LLC, Chicago, IL (US)

(72) Inventors: Shakeel Ur Rehman, Naperville, IL (US); Kamil Piotr Drapala, Chicago, IL (US)

(73) Assignee: fairlife, LLC, Chicago, IL (US)

( * ) Notice: Subject to any disclaimer, the term of this patent is extended or adjusted under 35 U.S.C. 154(b) by 413 days.

(21) Appl. No.: 18/005,424

(22) PCT Filed: Jul. 14, 2021

(86) PCT No.: PCT/US2021/041654
§ 371 (c)(1),
(2) Date: Jan. 13, 2023

(87) PCT Pub. No.: WO2022/015868
PCT Pub. Date: Jan. 20, 2022

(65) Prior Publication Data
US 2023/0255224 A1    Aug. 17, 2023

Related U.S. Application Data

(60) Provisional application No. 63/052,998, filed on Jul. 17, 2020.

(51) Int. Cl.
*A23C 9/144*    (2006.01)
*A23C 9/12*    (2006.01)
*A23C 9/142*    (2006.01)

(52) U.S. Cl.
CPC ............ *A23C 9/144* (2013.01); *A23C 9/1206* (2013.01); *A23C 9/1422* (2013.01); *A23C 9/1427* (2013.01)

(58) Field of Classification Search
CPC ..... A23C 9/144; A23C 9/1206; A23C 9/1422; A23C 9/1427
USPC ........................................................ 426/491
See application file for complete search history.

(56) References Cited

U.S. PATENT DOCUMENTS

| | | | |
|---|---|---|---|
| 4,855,056 | A | 8/1989 | Harju |
| 5,503,865 | A | 4/1996 | Behringer |
| 5,685,990 | A | 11/1997 | Saugmann et al. |
| 6,126,805 | A | 10/2000 | Batchelder |

(Continued)

FOREIGN PATENT DOCUMENTS

| | | |
|---|---|---|
| WO | 2001092555 A1 | 12/2001 |
| WO | 2004022787 A1 | 3/2004 |

(Continued)

OTHER PUBLICATIONS

Selby, Gaynor, "Australian Researchers Fast-Tracking New Forward Osmosis Food Technology," Dec. 16, 2016, https://www.foodingredientsfirst.com/news/australian-researchers-fast-tracking-new-forward-osmosis-food-technology.html, 2 pages.

(Continued)

*Primary Examiner* — Brent T O'Hern
(74) *Attorney, Agent, or Firm* — Merchant & Gould P.C.

(57) ABSTRACT

Methods for preparing dairy compositions utilize an electrodialysis apparatus to separate a feed stream into a lactose stream and a mineral stream. The feed stream can be a UF permeate fraction, a NF retentate fraction, or a RO retentate fraction. The brine input to the electrodialysis apparatus can be a milk mineral stream.

17 Claims, 2 Drawing Sheets

(56) References Cited

U.S. PATENT DOCUMENTS

| | | |
|---|---|---|
| 6,383,540 B1 | 5/2002 | Noel |
| 7,067,014 B2 | 6/2006 | Theoleyre |
| 7,169,428 B2 | 1/2007 | Dunker |
| 7,338,561 B2 | 3/2008 | Theoleyre |
| 9,510,606 B2 | 12/2016 | Ur-Rehman et al. |
| 9,538,770 B2 | 1/2017 | Ur-Rehman et al. |
| 2004/0040448 A1 | 3/2004 | Dunker |
| 2013/0309353 A1* | 11/2013 | Ur-Rehman ......... A23C 9/1512 426/42 |
| 2013/0309354 A1* | 11/2013 | Ur-Rehman ......... A23C 9/1512 426/42 |
| 2016/0199784 A1 | 7/2016 | Choudhary |
| 2018/0153184 A1* | 6/2018 | Ur Rehman ......... A23C 9/1422 |
| 2019/0116825 A1 | 4/2019 | Doring |
| 2019/0116826 A1 | 4/2019 | Doring |
| 2019/0223461 A1 | 7/2019 | Ur Rehmen |
| 2019/0289868 A1 | 9/2019 | Doring |
| 2019/0320672 A1 | 10/2019 | Holst |

FOREIGN PATENT DOCUMENTS

| | | |
|---|---|---|
| WO | 2004022788 A1 | 3/2004 |
| WO | 2008101449 A1 | 8/2008 |
| WO | 2015099960 A1 | 7/2015 |
| WO | 2016207579 A1 | 12/2016 |
| WO | 2019180389 A1 | 9/2019 |
| WO | 2020074823 A1 | 4/2020 |
| WO | WO 2022/015868 A1 | 1/2022 |

OTHER PUBLICATIONS

International Search Report and Written Opinion for PCT/US2021/041654, Oct. 21, 2021, 12 pgs.

Hoppe G K et al., Demineralization, Desalination, Elsevier, Amsterdam, NL pp. 99-131, Jan. 1, 1992, XP009528113, ISSN: 0011-9164. Retrieved from the internet: https://link.springer.com/chapter/10.1007%2F978-94-011-2894-0_3#citeas.

* cited by examiner

PRODUCTION AND SEPARATION OF MILK FRACTIONS WITH ELECTRODIALYSIS

REFERENCE TO RELATED APPLICATIONS

This application is National Stage Application of PCT/US2021/041654, filed on 14 Jul. 2021, which claims priority to U.S. Provisional Patent Application No. 63/052,998, filed on 17 Jul. 2020, the disclosures of which are incorporated herein by reference in their entirety. To the extent appropriate, a claim of priority is made to the above disclosed applications.

BACKGROUND OF THE INVENTION

The present invention relates generally to separating a milk product into protein, fat, carbohydrate, and mineral components using combinations of filtration, electrodialysis, and osmosis techniques. Also encompassed are dairy compositions produced by mixing the milk components in various combinations and proportions.

SUMMARY OF THE INVENTION

This summary is provided to introduce a selection of concepts in a simplified form that are further described herein. This summary is not intended to identify required or essential features of the claimed subject matter. Nor is this summary intended to be used to limit the scope of the claimed subject matter.

Consistent with aspects of this invention, a first method for making a dairy composition is disclosed, and the first method can comprise (a) ultrafiltering a skim milk product to produce a UF permeate fraction and a UF retentate fraction, (b) nanofiltering the UF permeate fraction to produce a NF retentate fraction and a NF permeate fraction, (c1) introducing the NF retentate fraction to a feed input of an electrodialysis apparatus, (c2) introducing water or a milk mineral stream to a brine input of the electrodialysis apparatus, (d) discharging from the electrodialysis apparatus a lactose stream and a mineral-enriched stream, (e) subjecting the NF permeate fraction or the mineral-enriched stream and the NF permeate fraction to reverse osmosis to produce a RO retentate fraction and a RO permeate fraction, and (f) combining at least the UF retentate fraction and the RO retentate fraction and/or the mineral-enriched stream to form the dairy composition.

A second method for making a dairy composition also is disclosed herein, and the second method can comprise (a) ultrafiltering a skim milk product to produce a UF permeate fraction and a UF retentate fraction, (b) nanofiltering a first portion of the UF permeate fraction to produce a NF retentate fraction and a NF permeate fraction, (c1) introducing a second portion of the UF permeate fraction to a feed input of an electrodialysis apparatus, (c2) introducing water or a milk mineral stream to a brine input of the electrodialysis apparatus, (d) discharging from the electrodialysis apparatus a lactose stream and a mineral-enriched stream, (e) subjecting the NF permeate fraction or the mineral-enriched stream and the NF permeate fraction to reverse osmosis to produce a RO retentate fraction and a RO permeate fraction, and (f) combining at least the UF retentate fraction and the RO retentate fraction and/or the mineral-enriched stream to form the dairy composition.

A third method for making a dairy composition also is disclosed herein, and the third method can comprise (a) ultrafiltering a skim milk product to produce a UF permeate fraction and a UF retentate fraction, (b) nanofiltering the UF permeate fraction to produce a NF retentate fraction and a NF permeate fraction, (c) subjecting the NF retentate fraction to reverse osmosis to produce a first RO retentate fraction and a first RO permeate fraction, (d1) introducing the first RO retentate fraction to a feed input of an electrodialysis apparatus, (d2) introducing water or a milk mineral stream to a brine input of the electrodialysis apparatus, (e) discharging from the electrodialysis apparatus a lactose stream and a mineral-enriched stream, (f) subjecting the NF permeate fraction or the mineral-enriched stream and the NF permeate fraction to reverse osmosis to produce a second RO retentate fraction and a second RO permeate fraction, and (g) combining at least the UF retentate fraction and the second RO retentate fraction and/or the mineral enriched stream to form the dairy composition.

Both the foregoing summary and the following detailed description provide examples and are explanatory only. Accordingly, the foregoing summary and the following detailed description should not be considered to be restrictive. Further, features or variations can be provided in addition to those set forth herein. For example, certain aspects can be directed to various feature combinations and sub-combinations described in the detailed description.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description and examples.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition can be applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, processes, and/or methods described herein are contemplated with or without explicit description of the particular combination. Additionally, unless explicitly recited otherwise, any aspect and/or feature disclosed herein can be combined to describe inventive designs, compositions, processes, and/or methods consistent with the present invention.

In this disclosure, while compositions and processes are often described in terms of "comprising" various components or steps, the compositions and processes can also "consist essentially of" or "consist of" the various components or steps, unless stated otherwise. For example, a dairy composition consistent with aspects of the present invention can comprise; alternatively, can consist essentially of; or alternatively, can consist of; a fat-rich fraction, a UF retentate fraction, and a RO retentate fraction.

The terms "a," "an," and "the" are intended to include plural alternatives, e.g., at least one, unless otherwise specified. For instance, the disclosure of "an ingredient" and "an additional milk fraction" are meant to encompass one, or mixtures or combinations of more than one, ingredient and additional milk fraction, unless otherwise specified.

In the disclosed processes, the term "combining" encompasses the contacting of components in any order, in any manner, and for any length of time, unless otherwise specified. For example, the components can be combined by blending or mixing.

The "lactose fraction" or "lactose stream" is meant to encompass a milk component fraction or stream that is rich in lactose or any derivatives thereof, e.g., hydrolyzed, unhydrolyzed, epimerized, isomerized, or converted to oligosaccharides, as would be recognized by one of skill in the art. Moreover, unless stated otherwise, this term also is meant to encompass glucose/galactose, such as may be produced by the treatment of lactose with lactase enzyme.

Although any methods and materials similar or equivalent to those described herein can be used in the practice or testing of the invention, the typical methods and materials are herein described.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses that a UF retentate fraction can have, in certain aspects, from 5 to 20 wt. % protein. By a disclosure that the protein content of the UF retentate fraction can be in a range from 5 to 20 wt. %, the intent is to recite that the protein content can be any amount within the range, and can include any range or combination of ranges from 5 to 20 wt. %, such as from 6 to 18 wt. %, from 9 to 15 wt. %, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

Methods for making dairy compositions are disclosed and described herein. Such methods can utilize an electrodialysis apparatus in combination with at least one of ultrafiltration, nanofiltration, and/or reverse osmosis.

While not wishing to be bound by theory, it is believed that the methods disclosed herein can extract and recover essential milk minerals from various process streams that would be lost otherwise. Further, these methods can result in relative mineral concentrations that are substantially the same as that in fresh milk—for example, the use of nanofiltration can result in the loss of divalent minerals such as calcium, if not recovered with electrodialysis as described herein.

Thus, a particular objective of this invention is to recover desirable milk minerals from UF permeate and NF retentate streams, which contain relatively large amounts of lactose, where such milk minerals would otherwise be lost. Also, another objective of this invention is to utilize both streams that are discharged from the electrodialysis apparatus. The discharged mineral-enriched stream, as described herein, is a source of additional recovered minerals that can be used to prepare a variety of milk-based dairy compositions. The discharged lactose stream is high purity lactose, with reduced levels of other milk components, such as a reduced mineral content. The purified lactose stream can be used in pharmaceutical applications, concentrated liquid lactose for use in infant formula manufacture, and to produce lactose powder, as well as for conversion into lactic acid, lactobionic acid, or ethanol.

Methods Using an Electrodialysis Step

In accordance with an aspect of this invention, a first method for making a dairy composition can comprise (or consist essentially of, or consist of) (a) ultrafiltering a skim milk product to produce a UF permeate fraction and a UF retentate fraction, (b) nanofiltering the UF permeate fraction to produce a NF retentate fraction and a NF permeate fraction, (c1) introducing the NF retentate fraction to a feed input of an electrodialysis apparatus, (c2) introducing water or a milk mineral stream to a brine input of the electrodialysis apparatus, (d) discharging from the electrodialysis apparatus a lactose stream and a mineral-enriched stream, (e) subjecting the NF permeate fraction or the mineral-enriched stream and the NF permeate fraction to reverse osmosis to produce a RO retentate fraction and a RO permeate fraction, and (f) combining at least the UF in retentate fraction and the RO retentate fraction and/or the mineral-enriched stream to form the dairy composition.

In accordance with another aspect of this invention, a second method for making a dairy composition can comprise (or consist essentially of, or consist of) (a) ultrafiltering a skim milk product to produce a UF permeate fraction and a UF retentate fraction, (b) nanofiltering a first portion of the UF permeate fraction to produce a NF retentate fraction and a NF permeate fraction, (c1) introducing a second portion of the UF permeate fraction to a feed input of an electrodialysis apparatus, (c2) introducing water or a milk mineral stream to a brine input of the electrodialysis apparatus, (d) discharging from the electrodialysis apparatus a lactose stream and a mineral-enriched stream, (e) subjecting the NF permeate fraction or the mineral-enriched stream and the NF permeate fraction to reverse osmosis to produce a RO retentate fraction and a RO permeate fraction, and (f) combining at least the UF retentate fraction and the RO retentate fraction and/or the mineral-enriched stream to form the dairy composition.

In accordance with yet another aspect of this invention, a third method for making a dairy composition can comprise (or consist essentially of, or consist of) (a) ultrafiltering a skim milk product to produce a UF permeate fraction and a UF retentate fraction, (b) nanofiltering the UF permeate fraction to produce a NF retentate fraction and a NF permeate fraction, (c) subjecting the NF retentate fraction to reverse osmosis to produce a first RO retentate fraction and a first RO permeate fraction, (d1) introducing the first RO retentate fraction to a feed input of an electrodialysis apparatus, (d2) introducing water or a milk mineral stream to a brine input of the electrodialysis apparatus, (e) discharging from the electrodialysis apparatus a lactose stream and a mineral-enriched stream, (f) subjecting the NF permeate fraction or the mineral-enriched stream and the NF permeate fraction to reverse osmosis to produce a second RO retentate fraction and a second RO permeate fraction, and (g) combining at least the UF retentate fraction and the second RO retentate fraction and/or the mineral enriched stream to form the dairy composition.

Generally, the features of these first, second, and third methods (e.g., the characteristics of the skim milk product, the feed input to the electrodialysis apparatus, the brine input to the electrodialysis apparatus, the lactose stream, the mineral-enriched stream, and the components that are combined to form the dairy composition, among others) are independently described herein and these features can be combined in any combination to further describe the disclosed methods. Moreover, other process steps can be conducted before, during, and/or after any of the steps listed in the disclosed methods, unless stated otherwise. Additionally, any dairy compositions (e.g., finished milk products, ready for consumption) produced in accordance with any of the disclosed methods are within the scope of this disclosure and are encompassed herein.

Filtration technologies (e.g., ultrafiltration, microfiltration, nanofiltration, and reverse osmosis) can separate or concentrate components in mixtures—such as milk—by passing the mixture through a membrane system (or selective barrier) under a suitable conditions (e.g., pressure). The concentration/separation can be, therefore, based on molecular size. The stream that is retained by the membrane is called the retentate (or concentrate). The stream that passes through the pores of the membrane is called the permeate.

Referring now to the first method for making a dairy composition, step (a) can comprise (a) ultrafiltering a skim milk product to produce a UF permeate fraction and a UF retentate fraction. The skim milk product in step (a) can comprise (or consist essentially of, or consist of) skim milk. In some aspects, the first method (or second method, or third method) can further comprise a step of separating (e.g., centrifugally separating) a raw milk or fresh milk into the skim milk product and a fat-rich fraction (also referred to as cream or butter fat). The raw milk or fresh milk can be cow's milk, which contains approximately 87 wt. % water, 3-4 wt. % protein, 4-5 wt. % carbohydrates/lactose, 3-4 wt. % fat, and 0.3-0.8 wt. % minerals. When the fresh or raw milk product is separated into the skim milk product and the fat-rich fraction, the fat-rich fraction typically contains high levels of fat (e.g., 20-50 wt. % fat, or 30-50 wt. % fat) and solids (e.g., 30-60 wt. %, or 40-55 wt. %), and often contains approximately 1.5-3.5 wt. % protein, 2-5 wt. % lactose, and 0.2-0.9 wt. % minerals, although not limited thereto. Also, while not be limited thereto, the skim milk product can contain less than or equal to 0.75 wt. %, less than or equal to 0.5 wt. %, or less than or equal to 0.25 wt. % fat; additionally or alternatively, from 2 to 5 wt. % or from 3 to 4 wt. % protein; additionally or alternatively, from 3 to 7 wt. % or from 4 to 6 wt. % lactose; and additionally or alternatively, from 0.4 to 1 wt. % or from 0.5 to 0.8 wt. % minerals.

In step (a), ultrafiltering of the skim milk product can be conducted using ultrafiltration membranes with pore sizes that typically are in the 0.01 to 0.1 micron range. In the dairy industry, the ultrafiltration membranes often are identified based on molecular weight cut-off (MWCO), rather than pore size. The molecular weight cut-off for ultrafiltration membranes can vary from 1000-100,000 Daltons. For instance, the skim milk product can be ultrafiltered using a polymeric membrane system (ceramic membranes also can be employed). The polymeric membrane system can be configured with pore sizes such that the materials having molecular weights greater than 1,000 Daltons, greater than 5,000 Daltons, or greater than 10,000 Daltons, are retained, while lower molecular weight species pass through. In some aspects, the step of ultrafiltering utilizes a membrane system having pore sizes in a range from 0.01 to 0.1 μm, and operating pressures typically in the 45-150 psig range.

While not being limited thereto, the protein content of the UF retentate fraction often can be at least 5 wt. %, at least 6 wt. %, at least 7 wt. %, at least 8 wt. %, or at least 9 wt. % protein. Illustrative and non-limiting ranges for the protein content of the UF retentate can include from 5 to 20 wt. % protein, from 6 to 18 wt. % protein, or from 9 to wt. % protein.

In step (b), the UF permeate fraction (some or all) can be nanofiltered to produce a NF retentate fraction and a NF permeate fraction. In step (b), nanofiltering of the UF permeate fraction can be conducted using nanofiltration membranes with pore sizes that typically are in the 0.001 to 0.01 micron range, for example, pore sizes in a range from 0.001 to 0.008 μm. In some aspects, the step of nanofiltering utilizes a membrane system having pore sizes in a range from 0.001 to 0.01 μm, with operating pressures typically in the 150-450 psig range, and operating temperatures ranging from 10 to 60° C. (or from 15 to 45° C.), although not limited thereto.

In step (c1), the NF retentate fraction (some or all) can be introduced to a feed input of the electrodialysis apparatus, while in step (c2), water or a milk mineral stream can be introduced to a brine input of the electrodialysis apparatus. While not limited thereto, the NF retentate fraction often contains less than or equal to 0.75 wt. %, less than or equal to 0.5 wt. %, or less than or equal to 0.35 wt. % protein, and further, often can contain less than or equal to 0.75 wt. %, less than or equal to 0.5 wt. %, or less than or equal to 0.35 wt. % fat. It can be advantageous for the NF retentate feed stream to the electrodialysis apparatus to be effectively protein-free and fat-free, e.g., less than or equal to 0.5 wt. %, and in some instances, less than or equal to 0.35 wt. %, less than or equal to 0.2 wt. %, or less than or equal to 0.1 wt. %, independently, of protein and fat. The lactose content of the NF retentate fraction typically ranges from 7 to 15 wt. % or from 9 to 12 wt. %, and the mineral content from 0.4 to 1 wt. % or from 0.4 to 0.8 wt. %, although not limited thereto.

The water or milk mineral stream in step (c2)—the brine input of the electrodialysis apparatus—can in one aspect be water such as deionized water or milk water (e.g., RO permeate fractions). In another aspect, the brine input can be any suitable milk mineral stream that contains from 0.05 to 5 wt. % milk minerals, such as from 0.1 to 2 wt. % milk minerals, or from 0.2 to 1.5 wt. % milk minerals. Often, the milk mineral stream can contain at least a portion of the RO permeate fraction, the RO retentate fraction, the NF permeate fraction, the mineral-enriched stream, or any combination thereof.

A lactose stream and a mineral-enriched stream (which contains both positively-charged and negatively-charged ions) can be discharged from the electrodialysis apparatus in step (d). While not limited thereto, the lactose stream can contain from 0.05 to 1 wt. % or from 0.1 to 0.5 wt. % protein; from 7 to 15 wt. % or from 10 to 12 wt. % lactose; and less than or equal to 0.5 wt. %, less than or equal to 0.35 wt. %, or less than or equal to 0.2 wt. % minerals.

The mineral-enriched stream generally contains only negligible amounts of protein, fat, and lactose, often less than or equal to 0.75 wt. %, less than or equal to 0.5 wt. %, or less than or equal to 0.35 wt. % of protein (or fat, or lactose). A majority of the minerals present in the NF retentate fraction generally are extracted and are discharged in the mineral-enriched stream. For instance, at least 65 wt. %, at least 75 wt. %, at least 80 wt. %, at least 85 wt. %, or at least 90 wt. %, of the minerals can be removed from the NF retentate fraction. These percentages can be based on the difference between the amount of minerals in the incoming NF retentate versus the amount of minerals in the outgoing lactose stream, or these percentages can be based on conductivity differences, or both. Therefore, typical mineral contents of the mineral-enriched stream include from 0.6 to 3 wt. %, from 0.7 to 2.5 wt. %, or from 0.8 to 2 wt. % minerals, and the like.

In step (e), the NF permeate fraction (some or all) or the mineral-enriched stream (some or all) and the NF permeate fraction (some or all) can be subjected to reverse osmosis to produce a RO retentate fraction and a RO permeate fraction. Thus, the NF permeate fraction can be subjected to reverse osmosis or both the mineral-enriched stream and the NF permeate fraction can be subjected (individually or mixed in any proportion) to reverse osmosis to produce the RO retentate fraction and the RO permeate fraction. Hence, it is optional to submit the mineral-enriched stream to reverse osmosis, particularly, if the mineral-enriched stream has a relatively large amount of minerals present after discharge from the electrodialysis apparatus.

Reverse osmosis is a tight filtration process in which substantially all the remaining milk components are retained (e.g., minerals), and only water (milk water) passes through. Generally, reverse osmosis comprises a membrane system having pore sizes of less than or equal to 0.001 μm. Operating pressures typically are in the 450-1500 psig, or 450-600 psig, range. Temperatures ranging from 5 to 45° C., or from 15 to 45° C., often can used.

Step (f) of the first method can comprise combining at least the UF retentate fraction and the RO retentate fraction and/or the mineral-enriched stream to form the dairy composition: for example, at least the UF retentate fraction and the RO retentate fraction, or at least the UF retentate fraction and the mineral-enriched stream, or at least the UF retentate fraction, the RO retentate fraction, and the mineral-enriched stream. Any combinations of these components can be mixed or combined, in any suitable relative proportions, to form the dairy composition. Optionally, a fat-rich fraction (cream) can added in the combining step to form the dairy composition, thus the fat-rich fraction, the UF retentate fraction, and the RO retentate fraction and/or the mineral-enriched stream can be combined to form the dairy composition. Also optionally, the lactose fraction and/or the RO permeate fraction can be added in the combining step to form the dairy composition. Moreover, an ingredient and/or an additional milk fraction also can be added in the combining step. Additionally or alternatively, an ingredient and/or an additional milk fraction can be added to the dairy composition after the combining step. Non-limiting examples of suitable ingredients can include a sugar/sweetener, a flavorant, a preservative (e.g., to prevent yeast or mold growth), a stabilizer, an emulsifier, a prebiotic substance, a probiotic bacteria, a vitamin, a mineral, an omega 3 fatty acid, a phyto-sterol, an antioxidant, or a colorant, and the like, as well as any mixture or combination thereof.

The additional milk fraction can be a "component-rich fraction," which is meant to encompass any fraction containing at least 15% more of a component of milk (protein, lactose/sugar, fat, minerals) than that found in cow's milk. For instance, a lactose-rich fraction often can contain from 6 to 20 wt. % sugar (i.e., in any form, such as lactose, glucose, galactose, etc.), from 6 to 18 wt. % sugar, or from 7 to 16 wt. % sugar. A fat-rich fraction often can contain from 8 to 50 wt. % fat, from 20 to 50 wt. % fat, or from 30 to 45 wt. % fat.

These component-rich milk fractions can be produced as described herein or by any technique known to those of skill in the art, such as by membrane filtration processes disclosed in U.S. Pat. Nos. 7,169,428, 9,510,606, and 9,538,770, which are incorporated herein by reference in their entirety. Additionally or alternatively, the component-rich milk fraction (or milk fractions) can be produced by a process comprising mixing water and a powder ingredient (e.g., protein powder, lactose powder, mineral powder, etc.).

Any suitable vessel and conditions can be used for any combining step disclosed herein, and such can be accomplished batchwise or continuously. As an example, the components can be combined in a suitable vessel (e.g., a tank, a silo, etc.) under atmospheric pressure, optionally with agitation or mixing, and optionally with an ingredient (or ingredients) and/or an additional milk fraction (or milk fractions), to form a batch of the finished dairy composition. As another example, the components can be combined continuously in a pipe or other suitable vessel under slight pressure (e.g., 5-50 psig), optionally mixed with ingredients and/or additional milk fractions, and the finished dairy composition can be transferred to a storage tank or filled into containers for retail distribution and sale. Representative systems that can be used for this continuous combining, mixing, and/or packaging can include tetra aldose systems and tetra flexidose systems. Other appropriate methods, systems, and apparatus for combining the components and other ingredients and/or milk fractions are readily apparent from this disclosure.

In one aspect, for instance, step (f) can comprise combining, at a minimum, the UF retentate fraction and the RO retentate fraction (or the mineral-enriched stream, or both the RO retentate fraction and the mineral-enriched stream), while in another aspect, step (f) can comprise combining, at a minimum, the fat-rich fraction, the UF retentate fraction, and the RO retentate fraction (or the mineral-enriched stream, or both the RO retentate fraction and the mineral-enriched stream). As described herein, these components can be combined in any suitable proportions, and optionally, an ingredient and/or additional milk fraction can added in step (f) to form the dairy composition.

Referring now to the second method for making a dairy composition, step (a) comprises ultrafiltering a skim milk product to produce a UF permeate fraction and a UF retentate fraction as described hereinabove for the first method. The skim milk product in step (a) of the second method can be the same as that described hereinabove for the skim milk product in step (a) of the first method for making a dairy composition. For instance, the second method can further comprise a step of separating (e.g., centrifugally separating) a raw milk or fresh milk into the skim milk product (skim milk) and a fat-rich fraction (cream or butter fat) before step (a).

Likewise, step (b) of the second process can be the same as step (b) of the first process, except that a first portion of the UF permeate fraction is nanofiltered to produce a NF retentate fraction and a NF permeate fraction. In the second process, a first portion of the UF permeate fraction is nanofiltered in step (b), while a second portion of the UF permeate fraction is fed to the electrodialysis apparatus in step (c1). Any relative amounts of the first portion and the second portion can be used.

While not limited thereto, the UF permeate fraction—like the NF retentate fraction—can contain only minimal amounts of protein and fat; typical amounts of protein and fat, independently, in the UF permeate fraction include less than or equal to 0.75 wt. %, less than or equal to 0.5 wt. %, or less than or equal to 0.35 wt. %, and the like. Illustrative and non-limiting amounts of lactose and minerals in the UF permeate fraction include, for instance, from 3 to 6 wt. % (or from 4 to 5.5 wt. %) lactose and from 0.4 to 1 wt. % (or from 0.4 to 0.8 wt. %) minerals.

Water or a milk mineral stream is introduced to a brine input of the electrodialysis apparatus in step (c2), and the brine input options for the second process are the same as for the first process described hereinabove. For instance, the water or milk mineral stream in step (c2) can comprise at least a portion of the RO permeate fraction, the RO retentate fraction, the NF permeate fraction, the mineral-enriched stream, or any combination thereof. Also, like the first process, in step (d) of the second process, a lactose stream and a mineral-enriched stream are discharged from the electrodialysis apparatus. The mineral-enriched stream in the second process can have the same compositional features as disclosed for the first process, while the lactose stream in the second process can contain from 0.05 to 1 wt. % or from 0.1 to 0.5 wt. % protein, from 3 to 6 wt. % or from 4 to 5 wt. % lactose, and less than or equal to 0.5 wt. %, less than or equal to 0.35 wt. %, or less than or equal to 0.2 wt. % minerals. It is contemplated that at least 65 wt. %, at least 75 wt. %, at least 80 wt. %, at least 85 wt. %, or at least 90 wt. %, of the minerals can be removed from the UF permeate fraction, resulting in typical mineral contents of the mineral-enriched stream ranging from 0.6 to 3 wt. %, from 0.7 to 2.5 wt. %, or from 0.8 to 2 wt. % minerals.

In step (e) of the second process, the NF permeate fraction or the mineral-enriched stream and the NF permeate fraction can be subjected to reverse osmosis to produce a RO retentate fraction and a RO permeate fraction, as described for the first process. Similarly, the combining step—step (f)—in the second process can be the same as that described for the combining step in the first process. At least the UF retentate fraction and the RO retentate fraction and/or the mineral-enriched stream can be combined to form the dairy composition, while any of the fat-rich fraction, the lactose fraction, and/or the RO permeate fraction optionally can be added in the combining step to form the dairy composition, as well as one more ingredients, depending upon the desired dairy composition.

Figure 1:
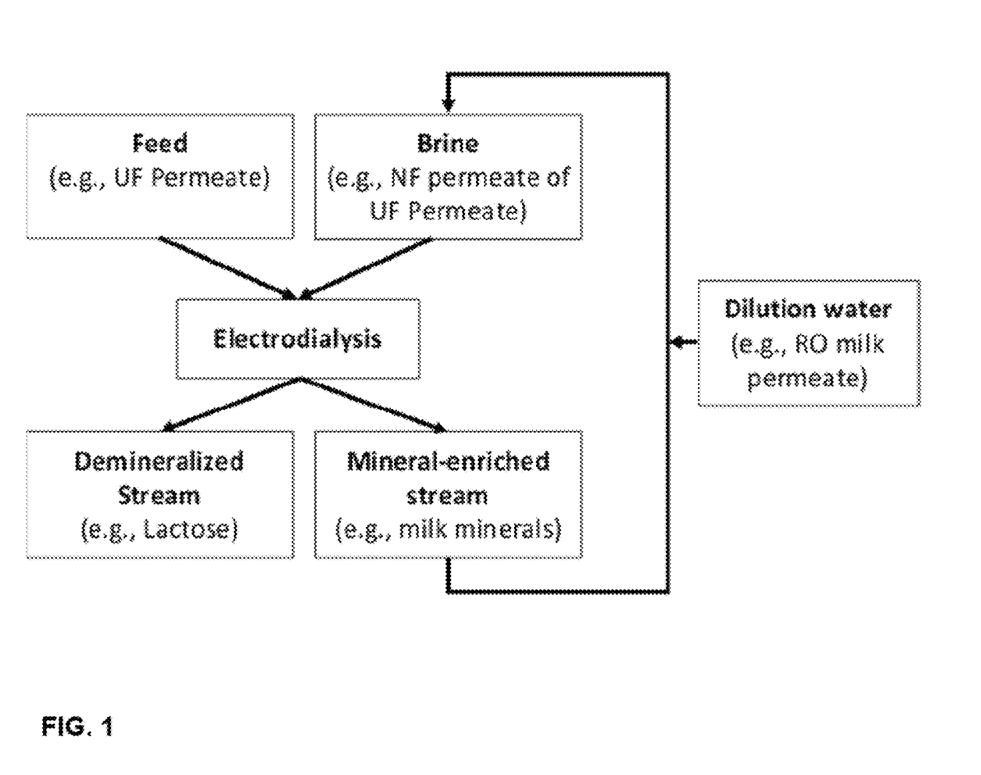
FIG. 1 presents a schematic flow diagram of a separations process consistent with an aspect of this invention, which utilizes electrodialysis.

An illustrative and non-limiting example of a suitable separations process consistent with aspects of the second method of this invention is shown in FIG. 1. The feed stream to electrodialysis can be the UF permeate and the brine stream can be the NF permeate of the UF permeate. Exiting electrodialysis are a lactose stream (demineralized stream) and a mineral-enriched stream, which is concentrated with essential milk minerals. Also, FIG. 1 demonstrates that a portion of the mineral-enriched stream can be recycled as the brine input, optionally with dilution from a RO permeate stream.

Figure 2:
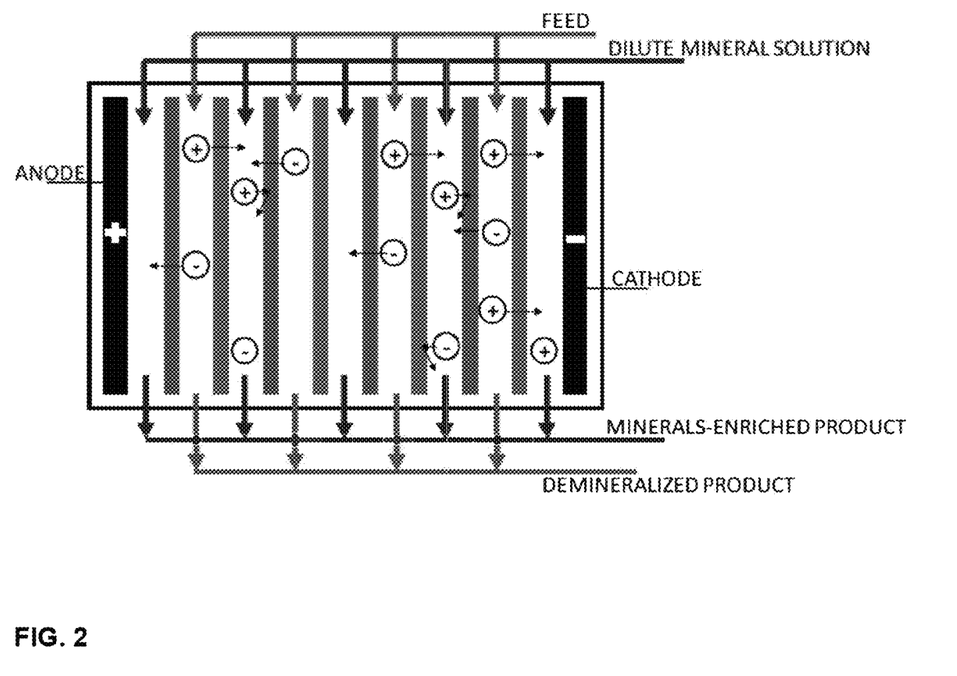
FIG. 2 presents a diagram of an electrodialysis apparatus that can be used in the process of FIG. 1.

FIG. 2 illustrates a diagram of an electrodialysis apparatus that can be used in the methods disclosed herein. Inlet streams (feed and brine) and outlet streams (demineralized product and mineral-enriched product) are shown in FIG. 2, in which positively-charged and negatively-charged ions move through selectively-permeable membranes driven by the electric charges of the anode and the cathode. In this manner, minerals are extracted from the feed stream and concentrated in the mineral-enriched stream exiting the electrodialysis apparatus.

Referring now to the third method for making a dairy composition, step (a) comprises ultrafiltering a skim milk product to produce a UF permeate fraction and a UF retentate fraction as described hereinabove for the first method. The skim milk product in step (a) of the third method can be the same as that described hereinabove for the skim milk product in step (a) of the first method for making a dairy composition. For instance, the third method can further comprise a step of separating (e.g., centrifugally separating) a raw milk or fresh milk into the skim milk product (skim milk) and a fat-rich fraction (cream or butter fat) prior to step (a).

In step (b) of the third method, the UF permeate fraction can be nanofiltered to produce a NF retentate fraction and a NF permeate fraction as described hereinabove for the first method. Next, in step (c) of the third method, the resulting NF retentate fraction can be subjected to reverse osmosis to produce a first RO retentate fraction and a first RO permeate fraction.

In step (d1), the first RO retentate fraction can be introduced to a feed input of the electrodialysis apparatus, while in step (d2), water or a milk mineral stream can be introduced to a brine input of the electrodialysis apparatus. While not limited thereto, the first RO retentate fraction can contain from 0.05 to 1 wt. % or from 0.3 to 0.7 wt. % protein, and less than or equal to 0.75 wt. %, less than or equal to 0.5 wt. %, or less than or equal to 0.35 wt. % fat. The first RO retentate fraction also can contain from 13 to 23 wt. % or from 17 to 20 wt. % lactose, and from 0.5 to 2 wt. % or from 1.2 to 1.6 wt. % minerals, although not limited thereto.

The milk mineral stream in step (d2)—the brine input of the electrodialysis apparatus—can have any suitable mineral content, such as described in relation to the first method. Often, the water or milk mineral stream in step (d2) comprises at least a portion of the first RO permeate fraction, the second RO permeate fraction, the NF permeate fraction, the first RO retentate fraction, the second RO retentate fraction, the mineral-enriched stream, or any combination thereof.

A lactose stream and a mineral-enriched stream (which contains both positively-charged and negatively-charged ions) can be discharged from the electrodialysis apparatus in step (e) of the third method. While not limited thereto, the lactose stream can contain from 0.05 to 1 wt. % or from 0.3 to 0.7 wt. % protein, from 13 to 23 wt. % or from 17 to 20 wt. % lactose, and less than or equal to 0.5 wt. %, less than or equal to 0.35 wt. %, or less than or equal to 0.2 wt. % minerals. The mineral-enriched stream in the third process can have the same compositional features as disclosed for the first process, e.g., from 0.6 to 3 wt. %, from 0.7 to 2.5 wt. %, or from 0.8 to 2 wt. % minerals. Likewise, it is contemplated that at least 65 wt. %, at least 75 wt. %, at least 80 wt. %, at least 85 wt. %, or at least 90 wt. %, of the minerals can be removed from the first RO retentate fraction. As above, these percentages can be based on the difference between the amount of minerals in the incoming RO retentate versus the amount of minerals in the outgoing lactose stream, or these percentages can be based on conductivity differences, or both.

Similar to the first process, in step (f) of the third process, the NF permeate fraction or the mineral-enriched stream and the NF permeate fraction can be subjected to reverse osmosis to produce a second RO retentate fraction and a second RO permeate fraction. Also similar to the first process, at least the UF retentate fraction and the second RO retentate fraction and/or the mineral enriched stream can be combined to form the dairy composition in step (g) of the third process. Other components also can be combined to form the dairy composition, such as a fat-rich fraction, suitable ingredients, and the like. Any combinations of these components can be mixed or combined, in any suitable relative proportions, to form the dairy composition. Representative examples of suitable ingredients and suitable additional milk fractions are disclosed hereinabove (e.g., in relation to the first method for making a dairy compositions) and can be utilized without limitation in the third method for making a dairy composition.

Consistent with aspects of the first, second, and third methods for making a dairy composition disclosed herein, these methods do not require the use of any acid (e.g., any mineral acid, such as sulfuric acid) during the process. In particular, no acid (e.g., mineral acid) is needed during the electrodialysis step. Since both the lactose stream and the mineral-enriched streams are desirable milk fraction streams, the use of acids such as sulfuric acid would contaminate these streams, and is typically avoided. Even in the absence of acid, the pH of the milk mineral stream often can be in a fairly narrow pH range of from 4.8 to 7.2, such as from 4.8 to 6, from 5 to 7.2, from 5 to 6.4, or from 5 to 6.

For efficient separation in the electrodialysis step in these three methods, it can be beneficial for the NF retentate fraction and/or the UF permeate fraction and/or the first RO retentate fraction—the feed input to electrodialysis—to have a temperature corrected conductivity in a range from 0.5 to 18 mS/cm; alternatively, from 1 to 15 mS/cm; alternatively, from 2 to 12 mS/cm; or alternatively, from 4 to 7 mS/cm. Likewise, it can beneficial for electrodialysis separation in these three methods for the mineral-enriched stream to be characterized by a temperature corrected conductivity in a range from 15 to 30, from 15 to 25, from 17 to 23, or from 20 to 28 mS/cm.

Consistent with aspects of the first, second, and third methods for making a dairy composition disclosed herein, these methods can further comprise a step of treating the respective dairy composition with lactase enzyme, if desired. Additionally or alternatively, the first, second, and third methods can further comprise a step of treating the UF retentate fraction with lactase enzyme prior to the combining step. Additionally or alternatively, the first, second, and third methods can further comprise a step of treating the skim milk product with lactase enzyme prior to step (a), such that the lactose stream discharged from the electrodialysis apparatus is a glucose/galactose stream.

Moreover, these three methods also can further comprise a step of heat treating the dairy composition. In one aspect, the step of heat treating can comprise pasteurizing at a temperature in a range from 80° C. to 95° C. for a time period in a range from 2 to 15 minutes. In another aspect, the step of heat treating can comprise UHT sterilization at a temperature in a range from 135° C. to 145° C. for a time period in a range from 1 to 10 seconds. In yet another aspect, the step of heat treating can comprise UHT sterilization at a temperature in a range from 148° C. to 165° C. for a time period in a range from 0.05 to 1 sec. Other appropriate pasteurization or sterilization temperature and time conditions are readily apparent from this disclosure. Further, this invention is not limited by the method or equipment used for performing the pasteurization/sterilization process-any suitable technique and apparatus can be employed, whether operated batchwise or continuously.

In some aspects of this invention, the first, second, and third methods for making a dairy composition can further comprise a step of packaging (aseptically or otherwise) the dairy composition in any suitable container and under any suitable conditions. Thus, after combining the various components, ingredients, and additional milk fractions as described herein to form the dairy composition, the dairy composition can be packaged under aseptic conditions (or non-aseptic conditions) in a container. Any suitable container can be used, such as might be used for the distribution and/or sale of dairy products in a retail outlet. Illustrative and non-limiting examples of typical containers include a cup, a bottle, a bag, or a pouch, and the like. The container can be made from any suitable material, such as glass, metal, plastics, and the like, as well as combinations thereof.

While not being limited thereto, the dairy composition can have a protein content of from 1 to 15 wt. %, or from 3 to 10 wt. %. Additionally or alternatively, the dairy composition can have a fat content of from 0.05 to 10 wt. %, or from 0.1 to 5 wt. %. Additionally or alternatively, the dairy composition can have a mineral content of from 0.5 to 2 wt. %. Additionally or alternatively, the dairy composition can have a lactose content of less than or equal to 4 wt. %.

A representative and non-limiting example of a dairy composition consistent with this invention can contain less than or equal to 0.5 wt. % fat, from 2 to 15 wt. % protein, from 0.5 to 2 wt. % minerals, and less than or equal to 4 wt. % lactose. Another example of a dairy composition consistent with this invention can contain from 0.5 to 1.5 wt. % fat, from 2 to 15 wt. % protein, from 0.5 to 2 wt. % minerals, and less than or equal to 4 wt. % lactose. Yet another example of a dairy composition consistent with this invention can contain from 1.5 to 2.5 wt. % fat, from 2 to 15 wt. % protein, from 0.5 to 2 wt. % minerals, and less than or equal to 4 wt. % lactose. Still another example of a dairy composition consistent with this invention can contain from 2.5 to 5 wt. % fat, from 2 to 15 wt. % protein, from 0.5 to 2 wt. % minerals, and less than or equal to 4 wt. % lactose.

Additional non-limiting examples of typical dairy compositions that can be produced by the methods disclosed herein include whole milk, low-fat milk, skim milk, buttermilk, flavored milk, low lactose milk, high protein milk, lactose-free milk, ultra-filtered milk, micro-filtered milk, concentrated milk, evaporated milk, high protein, high calcium, and reduced sugar milk, and the like.

Optionally, any reverse osmosis step disclosed herein can be replaced with a forward osmosis step, thereby forming a FO mineral concentrate and a water fraction (instead of a RO retentate and a RO permeate). Forward osmosis is typically performed at much lower pressures than reverse osmosis, and utilizes a semi-permeable membrane system having pore sizes such that water passes through, while other materials (e.g., proteins, fats, lactose or other sugars, and minerals) do not. Operating pressures typically are less than 50 psig, and temperatures ranging from 5 to 50° C. often can used, while not being limited thereto. As compared to reverse osmosis, forward osmosis often can achieve higher solids (e.g., often up to 40-60 wt. %), and is less susceptible to fouling.

In this disclosure, various milk material streams are fed into the electrodialysis apparatus, such as a UF permeate fraction, a NF retentate fraction, and a RO retentate fraction. It is contemplated that other milk material streams can be used as feed streams into the electrodialysis apparatus, and these include but are not limited to, a NF permeate fraction, a MF (microfiltration) permeate fraction, a RO retentate fraction of the MF permeate fraction, a RO retentate fraction of a UF permeate fraction, and a RO retentate fraction of a NF permeate fraction, and the like.

EXAMPLES

The invention is further illustrated by the following examples, which are not to be construed in any way as imposing limitations to the scope of this invention. Various other aspects, modifications, and equivalents thereof which, after reading the description herein, can suggest themselves to one of ordinary skill in the art without departing from the spirit of the present invention or the scope of the appended claims.

Total solids (wt. %) can be determined in accordance with procedure SMEDP 15.10 C by CEM Turbo Solids and Moisture Analyzer (CEM Corporation, Matthews, North Carolina). Ash is the residue remaining after ignition in a suitable apparatus at 550° C. to a constant weight; such treatment at 550° C. typically eliminates all organic matter, with the remaining material being primarily minerals (Standard Methods for the examination of dairy products, $17^{th}$ edition (2004), American Public Health Association, Washington DC). The ash test can be performed using a Phoenix (CEM Microwave Furnace), which heats the samples at 550° C. for 30 min. The mineral content (in wt. %) is generally similar to the ash content (wt. %), and thus the result of an ash test is used for quantification of the total mineral content in this disclosure. Protein content, fat content, and lactose content can be determined by AOAC (Association of Official Analytical Chemists) methods. Specific Ca, Mg, Na, and K contents can be determined using a Perkin Elmer Atomic Absorption Spectrophotometer. Samples can be treated with trichloroacetic acid to precipitate proteins and the filtrate can be analyzed by the Atomic Absorption Spectrophotometer.

Constructive Example 1

In Constructive Example 1, a skim milk product can be subjected to an ultrafiltration step to produce a UF permeate fraction and a UF retentate fraction. The UF permeate fraction then can be subjected to electrodialysis to produce a lactose stream and a mineral stream. Any suitable milk mineral stream (e.g., containing ~0.3-5 wt. % milk minerals) can be used as the brine input stream. The expected compositions of the UF permeate, the lactose stream, and the mineral stream are provided in Table I. Of particular interest, the lactose stream has a minimal amount of minerals, whereas the mineral stream is free of lactose and protein, but contains 60 wt. % of the minerals (ash) removed from the feed stream (UF permeate).

Constructive Example 2

In Constructive Example 2, a skim milk product can be subjected to an ultrafiltration step to produce a UF permeate fraction and a UF retentate fraction, followed by subjecting the UF permeate to a nanofiltration step to produce a NF retentate fraction and a NF permeate fraction. The NF retentate fraction then can be subjected to electrodialysis to produce a lactose stream and a mineral stream. Any suitable milk mineral stream (e.g., containing ~0.3-5 wt. % milk minerals) can be used as the brine input stream. The expected compositions of the NF retentate, the lactose stream, and the mineral stream are provided in Table II. Of particular interest, the lactose stream has a minimal amount of minerals, whereas the mineral stream is free of lactose and protein, but contains 70 wt. % of the minerals removed from the feed stream (NF retentate).

Constructive Example 3

In Constructive Example 3, a skim milk product can be subjected to an ultrafiltration step to produce a UF permeate fraction and a UF retentate fraction, followed by subjecting the UF permeate to a nanofiltration step to produce a NF retentate fraction and a NF permeate fraction, followed by subjecting the NF retentate fraction to reverse osmosis to produce a RO retentate fraction and a RO permeate fraction. The RO retentate fraction then can be subjected to electrodialysis to produce a lactose stream and a mineral stream. Any suitable milk mineral stream (e.g., containing ~0.3-5 wt. % milk minerals) can be used as the brine input stream. The expected compositions of the RO retentate, the lactose stream, and the mineral stream are provided in Table III. Of particular interest, the lactose stream has a minimal amount of minerals, whereas the mineral stream is free of lactose and protein, but contains 75 wt. % of the minerals removed from the feed stream (RO retentate).

Constructive Example 4

In Constructive Example 4, a skim milk product can be subjected to an ultrafiltration step to produce a UF permeate fraction and a UF retentate fraction, followed by subjecting the UF permeate to reverse osmosis to produce a RO retentate fraction and a RO permeate fraction. The RO retentate fraction then can be subjected to electrodialysis to produce a lactose stream and a mineral stream. Any suitable milk mineral stream (e.g., containing ~0.3-5 wt. % milk minerals) can be used as the brine input stream. The expected compositions of the RO retentate, the lactose stream, and the mineral stream are provided in Table IV. Of particular interest, the lactose stream has a minimal amount of minerals, whereas the mineral stream is free of lactose and protein, but contains 80 wt. % of the minerals removed from the feed stream (RO retentate).

Constructive Example 5

In Constructive Example 5, the mineral stream from Example 1 can be concentrated using reverse osmosis to produce a RO concentrated mineral stream (concentration factor of 10×). The expected compositions of the mineral stream and the RO concentrate are provided in Table V. Both the mineral stream and the RO concentrate in Table V can be used as a brine input stream for electrodialysis.

Constructive Example 6

In Constructive Example 6, a dairy composition can be produced having the composition shown in Table VI by blending, at appropriate relative amounts, the components shown in Table VI.

In similar fashion, a wide variety of dairy compositions can be produced via the methods described herein, having a wide range of fat, protein, lactose, mineral (ash), and total solids contents.

Example 7

In Example 7, a NF retentate fraction was subjected to electrodialysis. First, a milk separator was used to perform cold bowl mechanical separation of whole milk into a fat-rich fraction (cream) and skim milk by means of centrifugal forces at a temperature below 45° F. The skim milk product was subjected to ultrafiltration (UF) in an ultrafiltration unit employing membrane filters having a molecular exclusion range of ~5,000-10,000 daltons. The UF membrane filters had a polysulfone/polypropylene support and a maximum pressure load of 150 psig. The skim milk was concentrated three-fold by single pass ultrafiltration to produce a UF retentate fraction and a UF permeate fraction; temperatures were kept below 45° F.

The UF permeate fraction was concentrated three-fold to four-fold by nanofiltration in a nanofiltration unit to form a lactose-rich nanofiltration (NF) retentate fraction and a reduced-lactose NF permeate fraction. The nanofiltration unit employed membrane filters having a molecular exclusion range of ~100-1000 daltons and a maximum pressure load of 600 psig. The compositions of the skim milk product, the UF retentate and UF permeate fractions, and the NF retentate and NF permeate fractions are summarized in Table VII.

Electrodialysis treatment of the NF retentate was conducted using a pilot unit equipped with a 10 cell-pair stack, having a total membrane area of 0.28 m², and consisting of AR103/CR61 membranes. Heavy cation membranes, CR64, were inserted adjacent to the electrode compartments to provide chemical isolation from the electrode rinse. No acid was used during operation. While in commercial or continuous operation, a single pass thru the ED unit may be advantageous, Example 7 was performed batchwise with multiple passes thru the ED unit.

Table VIII summarizes the results of Example 7. The feed NF retentate fraction contained ~0.66 wt. % minerals, and the starting brine input was a milk mineral stream containing ~1.04 wt. % minerals. Unexpectedly, over 80% demineralization of the NF retentate stream was achieved, based on conductivity (temperature corrected to 25° C.). The initial conductivity of the NF retentate stream was 6.04 mS/cm, and the final conductivity of the discharged lactose stream was 0.52 mS/cm, resulting in an approximate 91% demineralization based on conductivity. Temperature correction was performed by measuring conductivity of a sample of the NF retentate stream over the 15-45° C. range and determining the percentage change of the conductivity to that measured at 25° C., and then applying that percentage change to the other measured conductivity data in Table VIII.

A sample of the demineralized lactose stream was taken at about 30 min, and after ash analysis, found to have a mineral content of 0.18 wt. %. Although Example 7 was not complete at this point in time, there was still 70 wt. % demineralization, based on an initial mineral content of 0.60 wt. % (Table VII).

The estimated final amount of minerals in the lactose stream was 0.09 wt. %. While the brine input started with ~1.04 wt. % minerals, the final mineral-enriched stream surprisingly contained ~1.82 wt. % minerals. With no acid addition, the pH of the brine input stream and the mineral-enriched stream was surprisingly consistent in the 5.7-5.9 range. Estimated mineral content was determined by constructing a curve of known mineral contents and the respective measured conductivity, and using that mathematical relationship between mineral content and conductivity to estimate the mineral content from the measured conductivity, after applying a temperature correction to 25° C.

Example 8

In Example 8, a UF permeate fraction was subjected to electrodialysis treatment in a manner similar to that of Example 7. Table IX summarizes the results of Example 8. The feed UF permeate fraction contained ~0.90 wt. % minerals, and the starting brine input was a milk mineral stream containing ~1.63 wt. % minerals. Unexpectedly, over 80% demineralization of the UF permeate stream was achieved, based on conductivity (temperature corrected to 25° C.). The initial conductivity of the UF permeate stream was 4.66 mS/cm, and the final conductivity of the discharged lactose stream was 0.58 mS/cm, resulting in an approximate 87% demineralization based on conductivity. The estimated final amount of minerals in the lactose stream was 0.06 wt. %. While the brine input started with ~1.63 wt. % minerals, the final mineral-enriched stream surprisingly contained ~2.46 wt. % minerals. With no acid addition, the pH of the brine input stream and the mineral-enriched stream was surprisingly consistent in the 5.4-5.6 range.

TABLE I

|  | Total solids (wt. %) | Protein (wt. %) | Fat (wt. %) | Lactose (wt. %) | Minerals (wt. %) | Sodium (ppm) | Potassium (ppm) | Magnesium (ppm) | Calcium (ppm) |
|---|---|---|---|---|---|---|---|---|---|
| UF permeate | 5.50 | 0.2 | 0.0 | 4.7 | 0.60 | 400 | 1300 | 50 | 580 |
| Lactose stream | 5.14 | 0.2 | 0.0 | 4.7 | 0.24 | 160 | 520 | 20 | 232 |
| Mineral stream | 0.36 | 0.0 | 0.0 | 0.0 | 0.36 | 240 | 780 | 30 | 348 |

TABLE II

|  | Total solids (wt. %) | Protein (wt. %) | Fat (wt. %) | Lactose (wt. %) | Minerals (wt. %) | Sodium (ppm) | Potassium (ppm) | Magnesium (ppm) | Calcium (ppm) |
|---|---|---|---|---|---|---|---|---|---|
| NF retentate | 12.12 | 0.3 | 0.0 | 11.0 | 0.82 | 550 | 1900 | 130 | 1060 |

TABLE II-continued

| | Total solids (wt. %) | Protein (wt. %) | Fat (wt. %) | Lactose (wt. %) | Minerals (wt. %) | Sodium (ppm) | Potassium (ppm) | Magnesium (ppm) | Calcium (ppm) |
|---|---|---|---|---|---|---|---|---|---|
| Lactose stream | 11.55 | 0.3 | 0.0 | 11.0 | 0.25 | 165 | 570 | 39 | 318 |
| Mineral stream | 0.57 | 0.0 | 0.0 | 0.0 | 0.57 | 385 | 1330 | 91 | 742 |

TABLE III

| | Total solids (wt. %) | Protein (wt. %) | Fat (wt. %) | Lactose (wt. %) | Minerals (wt. %) | Sodium (ppm) | Potassium (ppm) | Magnesium (ppm) | Calcium (ppm) |
|---|---|---|---|---|---|---|---|---|---|
| RO retentate | 20.48 | 0.51 | 0.0 | 18.59 | 1.39 | 930 | 3211 | 220 | 1791 |
| Lactose stream | 19.44 | 0.51 | 0.0 | 18.59 | 0.35 | 232 | 803 | 55 | 448 |
| Mineral stream | 1.04 | 0.0 | 0.0 | 0.0 | 1.04 | 697 | 2408 | 165 | 1344 |

TABLE IV

| | Total solids (wt. %) | Protein (wt. %) | Fat (wt. %) | Lactose (wt. %) | Minerals (wt. %) | Sodium (ppm) | Potassium (ppm) | Magnesium (ppm) | Calcium (ppm) |
|---|---|---|---|---|---|---|---|---|---|
| RO retentate | 19.25 | 0.70 | 0.0 | 16.45 | 2.10 | 1400 | 4550 | 175 | 2030 |
| Lactose stream | 17.57 | 0.70 | 0.0 | 16.45 | 0.42 | 280 | 910 | 35 | 406 |
| Mineral stream | 1.68 | 0.00 | 0.0 | 0.00 | 1.68 | 1120 | 3640 | 140 | 1624 |

TABLE V

| | Total solids (wt. %) | Protein (wt. %) | Fat (wt. %) | Lactose (wt. %) | Minerals (wt. %) | Sodium (ppm) | Potassium (ppm) | Magnesium (ppm) | Calcium (ppm) |
|---|---|---|---|---|---|---|---|---|---|
| Mineral stream | 0.36 | 0.0 | 0.0 | 0.0 | 0.36 | 240 | 780 | 30 | 348 |
| RO concentrate | 3.60 | 0.0 | 0.0 | 0.0 | 3.60 | 2400 | 7800 | 300 | 3480 |

TABLE VI

| Dairy Component | Quantity per 1000 kg batch |
|---|---|
| Cream | 40 |
| Filtered Water | 446 |
| RO Mineral | 84 |
| UF Skim | 430 |
| Total | 1000 |

| Component | Amount in dairy composition (wt. %) |
|---|---|
| Fat | 1.91 |
| Protein | 5.38 |
| Ash/Minerals | 0.78 |
| Lactose | 2.48 |
| Total solids | 10.55 |

TABLE VII

| | Total solids (wt. %) | Protein (wt. %) | Fat (wt. %) | Lactose (wt. %) | Minerals (wt. %) |
|---|---|---|---|---|---|
| Skim Milk | 9.16 | 3.39 | 0.15 | 4.96 | 0.66 |
| UF retentate | 19.37 | 12.20 | 0.53 | 5.30 | 1.35 |
| UF permeate | 5.63 | 0.18 | 0.08 | 4.72 | 0.65 |
| NF retentate | 11.66 | 0.30 | 0.16 | 10.60 | 0.60 |
| NF permeate | 0.01 | 0 | 0 | 0 | 0.01 |

TABLE VIII

NF Retentate Feed

| Time (min) | Voltage (VDC) | Amps | Cond. (mS/cm) | Temp (° C.) | Temp. Corrected Cond. (mS/cm) | Estimated Minerals (wt. %) | pH | Flow (L/min) | Pressure (psig) |
|---|---|---|---|---|---|---|---|---|---|
| 0 | 0 | 0.0 | 5.46 | 21.8 | 6.04 | 0.66% | 6.64 | 3.50 | 6.0 |
| 5 | 38 | 7.5 | 4.11 | 24.9 | 4.13 | 0.53% | 6.54 | 3.50 | 6.0 |
| 10 | 36 | 6.0 | 2.84 | 27.0 | 2.68 | 0.38% | 6.39 | 3.50 | 6.0 |
| 15 | 31 | 5.0 | 2.01 | 28.3 | 1.83 | 0.28% | 6.21 | 3.50 | 6.0 |
| 20 | 30 | 4.0 | 1.45 | 29.3 | 1.28 | 0.20% | 6.03 | 3.50 | 6.0 |
| 25 | 28 | 3.0 | 1.05 | 30.1 | 0.91 | 0.15% | 5.68 | 3.75 | 6.0 |
| 30 | 28 | 2.5 | 0.77 | 30.7 | 0.66 | 0.11% | 5.48 | 3.75 | 6.0 |
| 35 | 27 | 2.0 | 0.62 | 31.2 | 0.52 | 0.09% | 5.16 | 3.75 | 6.0 |

TABLE VIII

Brine Feed

| Time (min) | Cond. (mS/cm) | Temp (° C.) | Temp. Corrected Cond. (mS/cm) | Estimated Minerals (wt. %) | pH | Flow (L/min) | Pressure (psig) |
|---|---|---|---|---|---|---|---|
| 0 | 11.74 | 22.2 | 11.25 | 1.04% | 5.7 | 3.75 | 6.0 |
| 5 | 14.92 | 25.1 | 13.54 | 1.31% | 5.8 | 3.75 | 6.0 |
| 10 | 17.61 | 27.1 | 15.42 | 1.56% | 5.8 | 3.75 | 6.0 |
| 15 | 18.75 | 28.0 | 16.16 | 1.65% | 5.9 | 3.75 | 6.0 |
| 20 | 19.85 | 29.1 | 16.79 | 1.74% | 5.9 | 3.75 | 6.0 |
| 25 | 20.45 | 29.8 | 17.10 | 1.78% | 5.9 | 3.50 | 6.0 |
| 30 | 20.85 | 30.4 | 17.26 | 1.80% | 5.9 | 3.40 | 6.0 |
| 35 | 21.10 | 30.7 | 17.38 | 1.82% | 5.9 | 3.40 | 6.0 |

TABLE IX

UF Permeate Feed

| Time (min) | Voltage (VDC) | Amps | Cond. (mS/cm) | Temp (° C.) | Temp. Corrected Cond. (mS/cm) | Estimated Minerals (wt. %) | pH | Flow (L/min) | Pressure (psig) |
|---|---|---|---|---|---|---|---|---|---|
| 0 | 0 | 0.0 | 3.26 | 13.9 | 4.66 | 0.90% | 6.78 | 3.45 | 5.50 |
| 5 | 28 | 5.0 | 1.99 | 19.7 | 2.33 | 0.34% | 6.55 | 3.50 | 5.25 |
| 10 | 28 | 3.5 | 1.39 | 21.4 | 1.54 | 0.20% | 6.29 | 3.75 | 5.50 |
| 15 | 26 | 2.5 | 0.85 | 23.1 | 0.89 | 0.10% | 5.76 | 3.75 | 5.75 |
| 20 | 25 | 2.0 | 0.57 | 24.4 | 0.58 | 0.06% | 5.23 | 3.75 | 5.75 |

TABLE IX

Brine Feed

| Time (min) | Cond. (mS/cm) | Temp (° C.) | Temp. Corrected Cond. (mS/cm) | Estimated Minerals (wt. %) | pH | Flow (L/min) | Pressure (psig) |
|---|---|---|---|---|---|---|---|
| 0 | 22.4 | 25.2 | 20.29 | 1.63% | 5.4 | 3.50 | 5.50 |
| 5 | 26.0 | 20.2 | 25.90 | 2.38% | 5.5 | 3.50 | 5.25 |

TABLE IX-continued

Brine Feed

| Time (min) | Cond. (mS/cm) | Temp (° C.) | Temp. Corrected Cond. (mS/cm) | Estimated Minerals (wt. %) | pH | Flow (L/min) | Pressure (psig) |
|---|---|---|---|---|---|---|---|
| 10 | 27.4 | 21.7 | 26.50 | 2.46% | 5.5 | 3.75 | 5.50 |
| 15 | 28.4 | 23.6 | 26.49 | 2.46% | 5.6 | 3.75 | 5.75 |
| 20 | 28.9 | 24.6 | 26.47 | 2.46% | 5.6 | 3.75 | 5.75 |

We claim:

1. A method for making a dairy composition, the method comprising:
   (a) ultrafiltering a skim milk product to produce an ultrafiltration (UF) permeate fraction and a UF retentate fraction;
   (b) nanofiltering the UF permeate fraction to produce a nanofiltration (NF) retentate fraction and a NF permeate fraction;

(c1) introducing the NF retentate fraction to a feed input of an electrodialysis apparatus;

(c2) introducing water or a milk mineral stream to a brine input of the electrodialysis apparatus;

(d) discharging from the electrodialysis apparatus a lactose stream and a mineral-enriched stream;

(e) subjecting the NF permeate fraction or the mineral-enriched stream and the NF permeate fraction to reverse osmosis to produce a reverse osmosis (RO) retentate fraction and a RO permeate fraction; and (f) combining at least the UF retentate fraction and the RO retentate fraction and/or the mineral-enriched stream to form the dairy composition.

2. The method of claim 1, wherein at least 65 wt. % of minerals are removed from the NF retentate fraction.

3. The method of claim 1, wherein the mineral-enriched stream contains:
less than or equal to 0.75 wt. % protein;
less than or equal to 0.75 wt. % fat;
less than or equal to 0.75 wt. % lactose; and
from 0.6 to 3 wt. % minerals.

4. The method of claim 1, wherein a fat-rich fraction is added in the (f) to form the dairy composition.

5. The method of claim 1, wherein at least one of the lactose stream and/or the RO permeate fraction is added in the (f) to form the dairy composition.

6. The method of claim 1, wherein an ingredient is added in the (f) to form the dairy composition, where the ingredient comprises a sugar/sweetener, a flavorant, a preservative, a stabilizer, an emulsifier, a prebiotic substance, a probiotic bacteria, a vitamin, a mineral, an omega 3 fatty acid, a phyto-sterol, an antioxidant, a colorant, or any combination thereof.

7. The method of claim 1, wherein the skim milk product contains:
less than or equal to 0.75 wt. % fat;
from 2 to 5 wt. % protein;
from 3 to 7 wt. % lactose; and
from 0.4 to 1 wt. % minerals.

8. The method of claim 1, wherein no acid or no mineral acid is added during the method.

9. The method of claim 1, wherein the NF retentate fraction is characterized by a temperature corrected conductivity in a range from 0.5 to 18 mS/cm.

10. The method of claim 1, wherein the mineral-enriched stream is characterized by a temperature corrected conductivity in a range from 15 to 30 mS/cm.

11. The method of claim 1, wherein a pH of the milk mineral stream is in a range from 4.8 to 7.2.

12. The method of claim 1, wherein the UF retentate fraction is treated with lactase enzyme prior to the (f).

13. The method of claim 1, wherein:
the skim milk product is treated with lactase enzyme prior to the (a); and
the lactose stream is a glucose/galactose stream.

14. The method of claim 1, wherein the method further comprises:
treating the dairy composition with lactase enzyme; and
heat treating the dairy composition.

15. The method of claim 14, wherein the heat treating comprises UHT sterilization at a temperature in a range from 135° C. to 145° C. for a time period in a range from 1 to 10 seconds.

16. A method for making a dairy composition, the method comprising:

(a) ultrafiltering a skim milk product to produce a UF permeate fraction and a UF retentate fraction;

(b) nanofiltering the UF permeate fraction to produce a NF retentate fraction and a NF permeate fraction;

(c1) introducing the NF retentate fraction to a feed input of an electrodialysis apparatus;

(c2) introducing water or a milk mineral stream to a brine input of the electrodialysis apparatus;

(d) discharging from the electrodialysis apparatus a lactose stream and a mineral-enriched stream;

(e) subjecting the NF permeate fraction or the mineral-enriched stream and the NF permeate fraction to reverse osmosis to produce a RO retentate fraction and a RO permeate fraction; and (f) combining at least the UF retentate fraction and the RO retentate fraction and/or the mineral-enriched stream to form the dairy composition, wherein the water or the milk mineral stream comprises at least a portion of the RO permeate fraction, the RO retentate fraction, the NF permeate fraction, the mineral-enriched stream, or any combination thereof.

17. A method for making a dairy composition, the method comprising:

(a) ultrafiltering a skim milk product to produce a UF permeate fraction and a UF retentate fraction;

(b) nanofiltering the UF permeate fraction to produce a NF retentate fraction and a NF permeate fraction, wherein the NF retentate fraction contains (i) less than or equal to 0.75 wt. % protein, (ii) less than or equal to 0.75 wt. % fat, (iii) from 7 to 15 wt. % wt. % lactose, and (iv) from 0.4 to 1 wt. % minerals;

(c1) introducing the NF retentate fraction to a feed input of an electrodialysis apparatus;

(c2) introducing water or a milk mineral stream to a brine input of the electrodialysis apparatus;

(d) discharging from the electrodialysis apparatus a lactose stream and a mineral-enriched stream, wherein the lactose stream contains (i) from 0.05 to 1 wt. % wt. % protein, (ii) from 7 to 15 wt. % lactose, and (iii) less than or equal to 0.5 wt. % minerals;

(e) subjecting the NF permeate fraction or the mineral-enriched stream and the NF permeate fraction to reverse osmosis to produce a RO retentate fraction and a RO permeate fraction; and (f) combining at least the UF retentate fraction and the RO retentate fraction and/or the mineral-enriched stream to form the dairy composition.

* * * * *